United States Patent [19]
Tang

[11] Patent Number: 4,622,523
[45] Date of Patent: Nov. 11, 1986

[54] GROUP DELAY EQUALIZERS USING SHORT CIRCUIT TRIPLE MODE FILTERS

[75] Inventor: Wai-Cheung Tang, Kitchener, Canada

[73] Assignee: Com Dev Ltd., Cambridge, Canada

[21] Appl. No.: 710,156

[22] Filed: May 3, 1985

Related U.S. Application Data

[62] Division of Ser. No. 573,462, Jan. 24, 1984.

[30] Foreign Application Priority Data

May 30, 1983 [CA] Canada .................................. 429238

[51] Int. Cl.[4] ......................... H01P 1/208; H04B 3/14
[52] U.S. Cl. .................................... 333/28 R; 333/208
[58] Field of Search .............. 333/212, 208, 209, 28 R

[56] References Cited

U.S. PATENT DOCUMENTS 2,890,421 6/1959 Currie ................................ 333/208
3,287,667 11/1966 Boutelant .......................... 333/28 R
3,699,480 10/1972 Mueller ............................ 333/28 R
4,410,865 10/1983 Young et al. ....................... 333/208

*Primary Examiner*—Eugene R. LaRoche
*Assistant Examiner*—Benny T. Lee
*Attorney, Agent, or Firm*—Daryl W. Schnurr

[57] ABSTRACT

A bandpass filter has a plurality of cascade waveguide cavities each resonating in three independent orthogonal modes. The cavities can be cylindrical or have a square cross-section. Where the cavities are circular, each cavity resonates in $TE_{111}$ or $TE_{010}$ modes simultaneously. Where the cavities have a square cross-section, each cavity resonates in $TE_{011}$ and $TM_{110}$ modes simultaneously. Between each triple-mode cavity, there is located an iris having an aperture with four separate radial slots that are offset from a center of the iris. The filter is capable of producing an elliptic function response. In a variation of the invention, an allpass filter has an output that is short circuited and, when used in conjunction with a circulator, it functions as a group delay equalizer. Previous triple-mode filters are not capable of producing an acceptable result relative to dual-mode filters.

4 Claims, 12 Drawing Figures

PRIOR ART

PRIOR ART

PRIOR ART

GROUP DELAY EQUALIZERS USING SHORT CIRCUIT TRIPLE MODE FILTERS

This is a divisional application of application Ser. No. 573,462 filed Jan. 24th, 1984.

BACKGROUND OF THE INVENTION

1. Field of the Invention

This invention relates to a triple mode filter and to a method of operating such a filter. In particular this invention relates to a filter having a cascade waveguide cavity resonating in first, second and third independent orthogonal modes simultaneously.

2. Description of the Prior Art

It is known to have a triple mode waveguide cavity filters. In COMSAT Technical Review, Volume 1, pages 21 to 42, published in the Fall of 1971, Atia and Williams suggested the possibility of cascading two triple mode waveguide cavities to realize a six pole elliptic filter function response. In theory, triple mode filters have an advantage over dual mode filters in that they produce economies in weight, volume and cost because of the realization of three electrical cavities in one physical cavity. However, previous triple mode filters have been unable to achieve acceptable results and, in particular, have failed to realize an elliptic function response. Also, previous triple mode filters have had input or output coupling means that are too complex or too heavy; or the filters have been too inefficient to compete with dual mode filters; or the intercavity coupling could not be adequately controlled. As previous triple mode filters did not produce the expected results, they are not widely used and the dual mode filter is now the dominant filter for use in satellites and multi-plexers. The communications satellite industry has long sought a solution to the problems related to previous triple mode filters.

It is an object of the present invention to provide a triple-mode filter that produces acceptable results and is lighter in weight and smaller in volume than comparable dual-mode filters.

SUMMARY OF THE INVENTION

A bandpass filter in accordance with the present invention has a plurality of cascade waveguide cavities, with at least two adjacent cavities mounted end to end relative to one another and resonating at their resonant frequency in three independent orthogonal modes. An inter-cavity coupling iris is located between adJacent three mode cavities that are mounted end to end relative to one another. Each iris contains an aperture that is able to control three inter-cavity couplings simultaneously when said filter is operated in a suitable propagation mode for input and output coupling to produce an elliptic function response.

Preferably, each aperture has four separate radial slots located perpendicular to one another and offset from a centre of the iris.

Preferably, when the cavities are cylindrical, the filter is operated in a $TE_{111}$ propagation mode for input and output coupling.

Preferably, when the cavities have a square cross-section, the filter is operated in a $TE_{101}$ propagation mode for input and output coupling.

In a variation of the present invention, a filter has at least two adjacent cascade waveguide cavities mounted end to end relative to one another resonating at their resonant frequency and three independent orthogonal modes. An inter-cavity coupling iris is located between adjacent three mode cavities that are mounted end to end relative to one another. Each iris contains an aperture that is able to control three intercavity couplings simultaneously when said filter is operated in a suitable propagation mode for input and output coupling. An output cavity of said filter is short circuited so that the filter will function as a group delay equalizer.

In a further variation, a filter has one cascade waveguide cavity resonating at its resonant frequency in three independent orthogonal modes. The cavity has two ends that are parallel to one another and at least one of said modes is non-identical to the remaining two modes. The filter is operated in a suitable propagation mode for input and output coupling. An output cavity of said filter is short circuited so that the filter can function as a group delay equalizer when used with a non-reciprocal structure.

There is provided a method of operating a bandpass filter having a plurality of cascade waveguide cavities mounted end to end relative to one another, with at least two adjacent cavities resonating at their resonant frequency in three independent orthogonal modes. An intercavity coupling iris is located between adjacent three mode cavities that are mounted end to end relative to one another and each iris contains an aperture that is able to control three inter-cavity couplings simultaneously. The method is operating the filter in a suitable propagation mode for input and output couplings to produce an elliptic function response.

BRIEF DESCRIPTION OF THE DRAWINGS

In the following drawings, there is shown a prior art filter as well as embodiments of the present invention.

DESCRIPTION OF A PREFERRED EMBODIMENT

Figure 1:
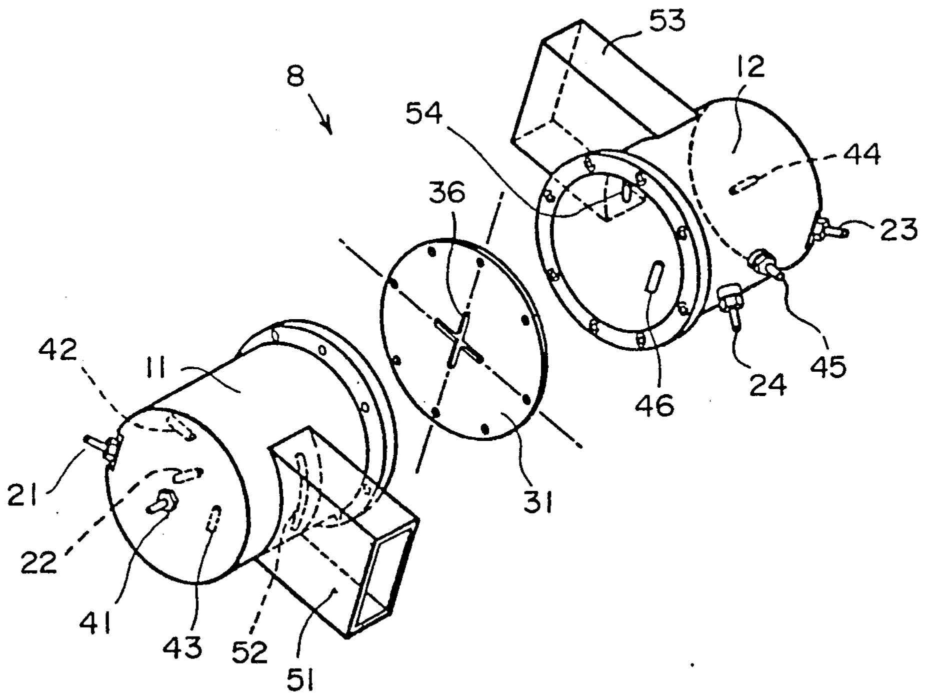
FIG. 1 is an exploded perspective view of a prior art triple-mode filter having cylindrical waveguide cavities.

Referring to the drawings in greater detail, in FIG. 1, there is shown a prior art triple-mode filter 8 in the form suggested by Atia and Williams. The filter 8 has a plurality of cascade waveguide cavities 11, 12, each of which resonates in a first $TM_{010}$ mode and a second and third $TE_{111}$ modes. The cavity 11 is an input cavity and the cavity 12 is an output cavity. Between the cavities 11, 12, there is located a coupling iris 31, which provides inter-cavity coupling means through an aperture 36. Since this is a triple-mode filter, each cavity is capable of supporting three independent modes. While there are two physical cavities 11, 12, there are six electrical cavities. Inter-cavity coupling between the three orthogonal modes within a given cavity is achieved by means of a physical discontinuity which perturbs the electrical field of one mode to couple energy into another mode. The physical discontinuity shown in FIG. 1 is represented by a series of coupling screws 21, 22, 23, 24. Said coupling screws are shown as being mounted at a 45 degree angle relative to tuning screws 41, 42, 43, 44, 45, 46. The tuning screws perturb the electrical field of each orthogonal mode independently and decrease the cut-off wavelength of the waveguide in the plane of each screw. Therefore, the cavity length for each mode appears electrically larger than its physical length.

Figure 1A:
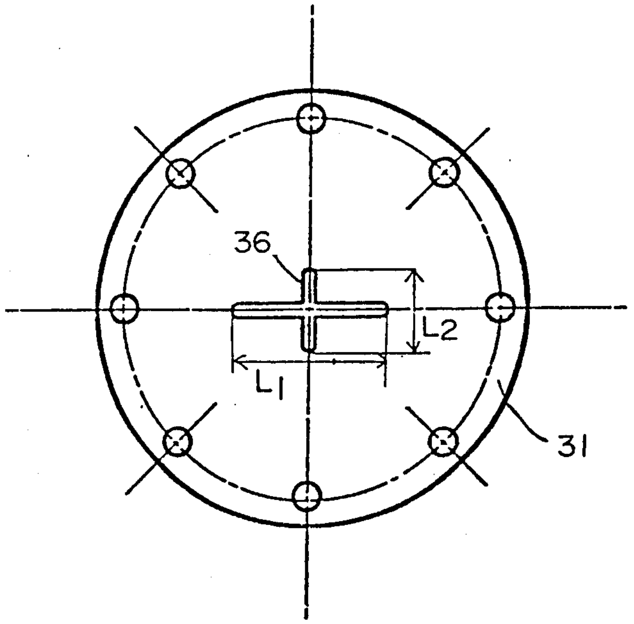
FIG. 1A is a front view of a prior art iris used in the filter of FIG. 1.

Inter-cavity $TE_{111}$ to $TE_{111}$ coupling is influenced by a magnetic field energy transfer through the aperture 36 in the iris 31. But, inter-cavity $TM_{010}$ to $TM_{010}$ coupling is influenced by both electric field and magnetic field energy transfer through the same aperture 36 in the iris 31. The input and output coupling means 51, 53 contains an aperture 52, 54 respectively. The input/output coupling is influenced by magnetic field energy transfer through the aperture 52 in input coupling means 51 and through the aperture 54 in output coupling means 53. These coupling means 51, 53 will couple energy into and out of the $TM_{010}$ mode. In other words, $TM_{010}$ mode is the propagation mode for input and output coupling in the filter 8. The aperture 36 of the iris 31 has a conventional cruciform shape. The shape of the aperture 36 controls only two independent inter-cavity couplings, namely $L_1$ and $L_2$ (see FIG. 1A). In order to realize completely general transfer functions in a triple mode filter, it is necessary to control three inter-cavity couplings simultaneously. If three independent inter-cavity couplings cannot be controlled in the triple mode filter, the theoretical superiority of the triple mode design over dual mode filters is lost. In practical usage, the results achieved by the prior art triple mode filter 8 are unacceptable over the results achieved by conventional dual mode filters. In addition, the propagation mode $TM_{010}$, suggested by Atia and Williams cannot be controlled in the filter 8. The physical slot dimension of the centrally located cruciform aperture 36 in the iris 31 is required to couple the remaining two $TE_{111}$ orthogonal modes but also permits large amounts of inter-cavity coupling for the $TM_{010}$ mode. Further, because of the use of the $TM_{010}$ mode for input and output coupling, the physical structure of the coupling means 51, 53 can be complex and sensitive, making the entire design impractical for use in a satellite transponder. This completes the discussion of the prior art triple mode filter 8, as shown in FIGS. 1 and 1A.

Figure 2:
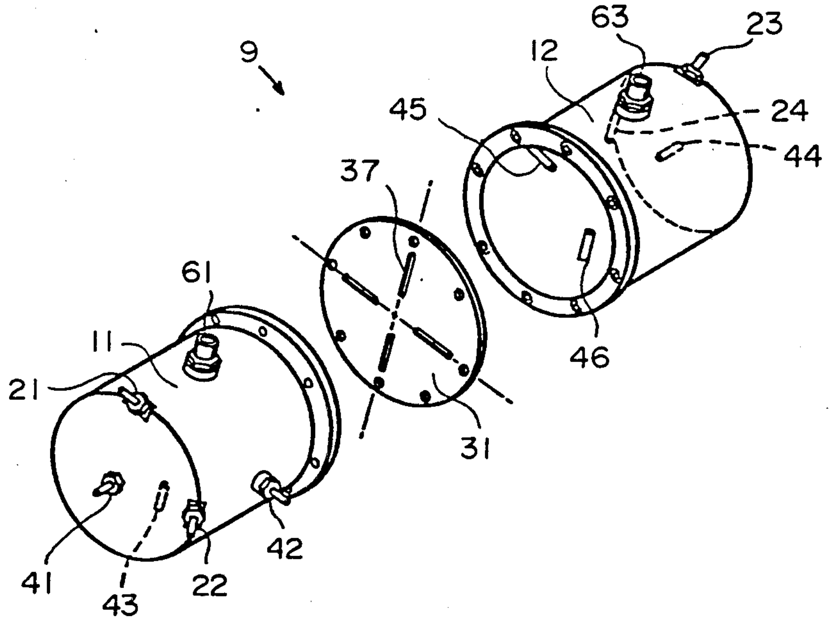
FIG. 2 is an exploded perspective view of a triple-mode filter in accordance with the present invention having cylindrical cavities and a coaxial interface.

Embodiments of the present invention will now be discussed using the same numerals, as used in FIGS. 1 and 1A, for those parts that are the same or similar. In accordance with the present invention, as shown in FIG. 2, a bandpass filter 9 has a plurality of cascade waveguide cavities 11, 12. The cavities 11, 12 are adjacent to one another and resonate at their resonant frequency in three independent orthogonal modes. The cavities 11, 12 have generally the same arrangement of coupling screws 21, 22, 23, 24 and tuning screws 41, 42, 43, 44, 45, 46 as previously described for the prior art filter 8. An inter-cavity coupling iris 31 is located between the adjacent three mode cavities 11, 12. Each iris 31 contains an aperture 37 that is able to control three inter-cavity couplings simultaneously, when said filter 9 is operated in a suitable propagation mode for input and output coupling, to produce an elliptic function response. The aperture 37 has four separate radial slots located perpendicular to one another, with all the slots being offset from a centre of the iris.

Figure 2A:
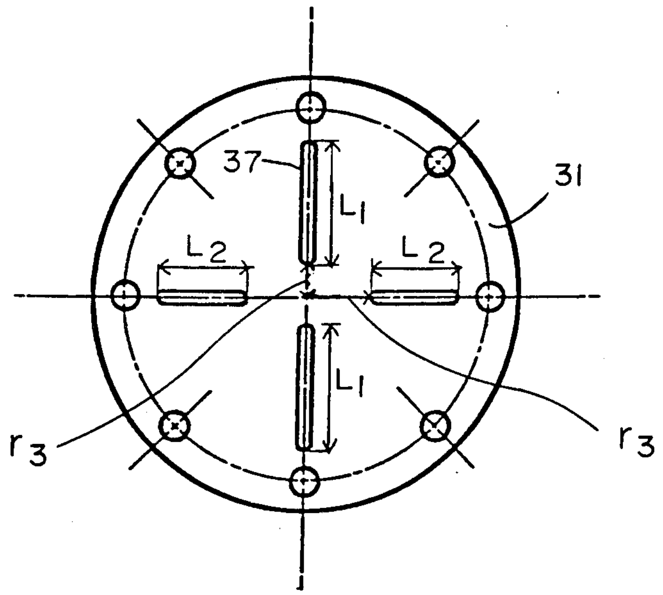
FIG. 2A is a front view of an iris in accordance with the present invention.

As shown in FIG. 2A, two of the slots that are aligned with one another are the same length $L_2$ and are offset from said centre by an equal distance $r_2$. The remaining two slots are also aligned with one another but have a different length $L_1$ and are offset by an equal distance $r_1$ that is different from the distance $r_2$. The radial slot arrangement of the aperture 37 provides three independent and controlable variables, firstly, the slot length $L_1$, secondly, the slot length $L_2$ and thirdly, the radial distance $r_1$ and $r_2$ of the slots from the centre. In addition, the pattern of the slots takes advantage of known electrical and magnetic field patterns to provide the necessary control for the $TM_{010}$ mode so that the filter 9 will function in an acceptable manner relative to dual-mode filters.

The coupling due to the $TM_{010}$ mode is minimal near the circumference of the iris or inter-cavity coupling means 31. By locating the slots of the aperture 37 a distance $r_1$ and $r_2$ from the centre of the iris 37, the coupling of the $TM_{010}$ mode can be properly controlled. The lengths $L_1$ and $L_2$ of the slots of the aperture 37 provide the necessary control for the $TE_{111}$ propagation modes.

In the filter 9 of the present invention, the cavities 11, 12 are cylindrical in shape. When the cavities are cylindrical, the filter 9 is operated in a $TE_{11n}$ propagation mode for input and output coupling, n being a positive integer. Preferably, the filter 9 is operated in a $TE_{111}$ propagation mode for input and output coupling. The use of the $TE_{11n}$ propagation mode permits input and output couplings via coaxial probes 61, 63, as shown in FIG. 2, thus accomplishing a saving in weight and volume. In addition, the use of the $TE_{11n}$ mode also permits maximum permissible control of inter-cavity couplings to enable the filter to realize general transfer functions required for satellite filters and multiplexers. By way of example, when a $TE_{111}$ propagation mode is used for input and output coupling in the filter 9, each cavity 11, 12 can be made to resonate in a first $TM_{010}$ mode and a second and third $TE_{111}$ modes.

While the cavities 11, 12 of the filter 9 are cylindrical, the cavities could be designed with a square cross-section. When the cavities have a square cross-section, the filter is operated in a $TE_{10n}$ propagation mode for input and output coupling, n being a positive integer. Preferably, when the cavities have a square cross-section, the filter is operated in a $TE_{101}$ propagation mode for input and output coupling. By way of example, when a $TE_{101}$ propagation mode is used for input and output coupling, each cavity can be made to resonate in a first $TM_{110}$ modes and a second and third $TE_{101}$ mode. Of course, it would also be possible to have a filter made up of one or more cylindrical cavities and one or more cavities having a square cross-section. Also, it would be possible to have a bandpass filter with one or more triple-mode cavities and one or more single or dual-mode cavities.

Figure 3:
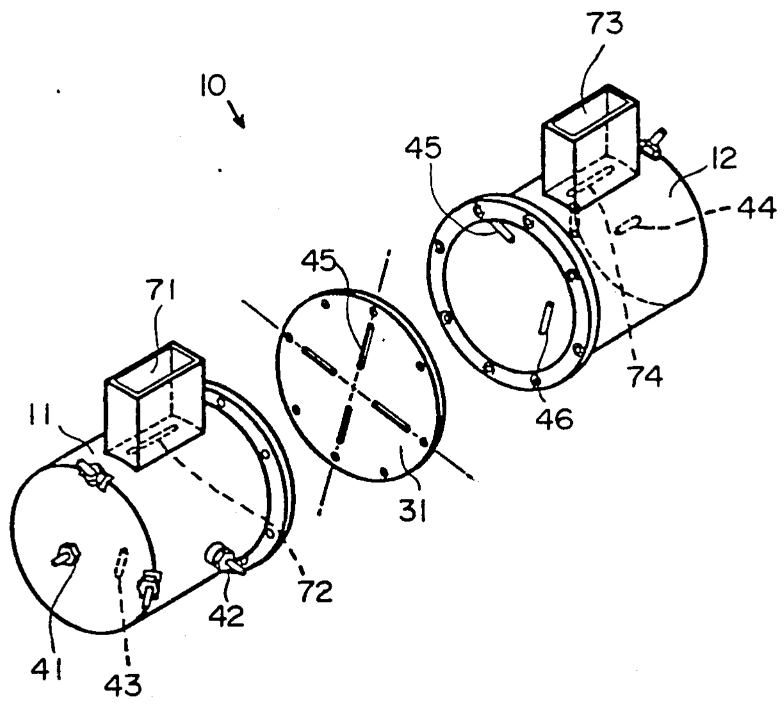
FIG. 3 is an exploded perspective view of a filter in accordance with the present invention having cylindrical cavities and a waveguide interface.

In FIG. 3, a filter 10 is nearly identical to filter 9. The only difference is that waveguide input and output coupling means 71, 73 are used via radial slots 72, 74 respectively for input and output coupling. The same modes would be used with the filter 10 as described for the filter 9.

Figure 4A:
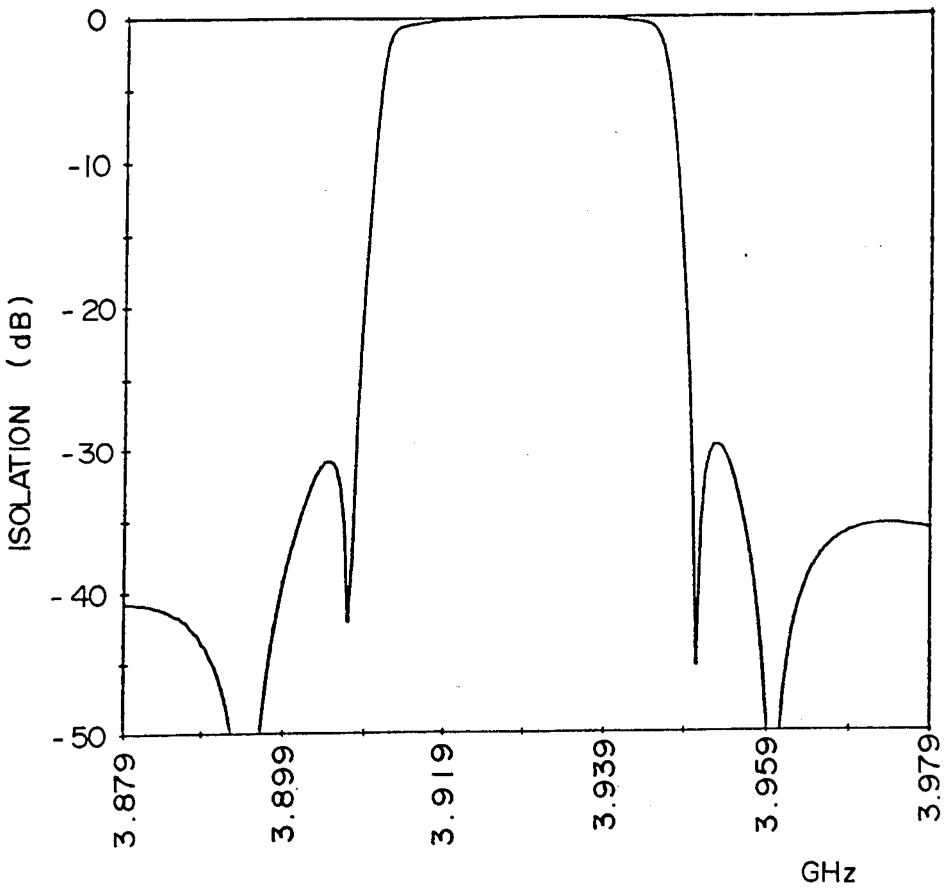
FIGS. 4A and 4B are graphs showing experimental response characteristics of filters designed in accordance with the present invention.
Figure 4B:
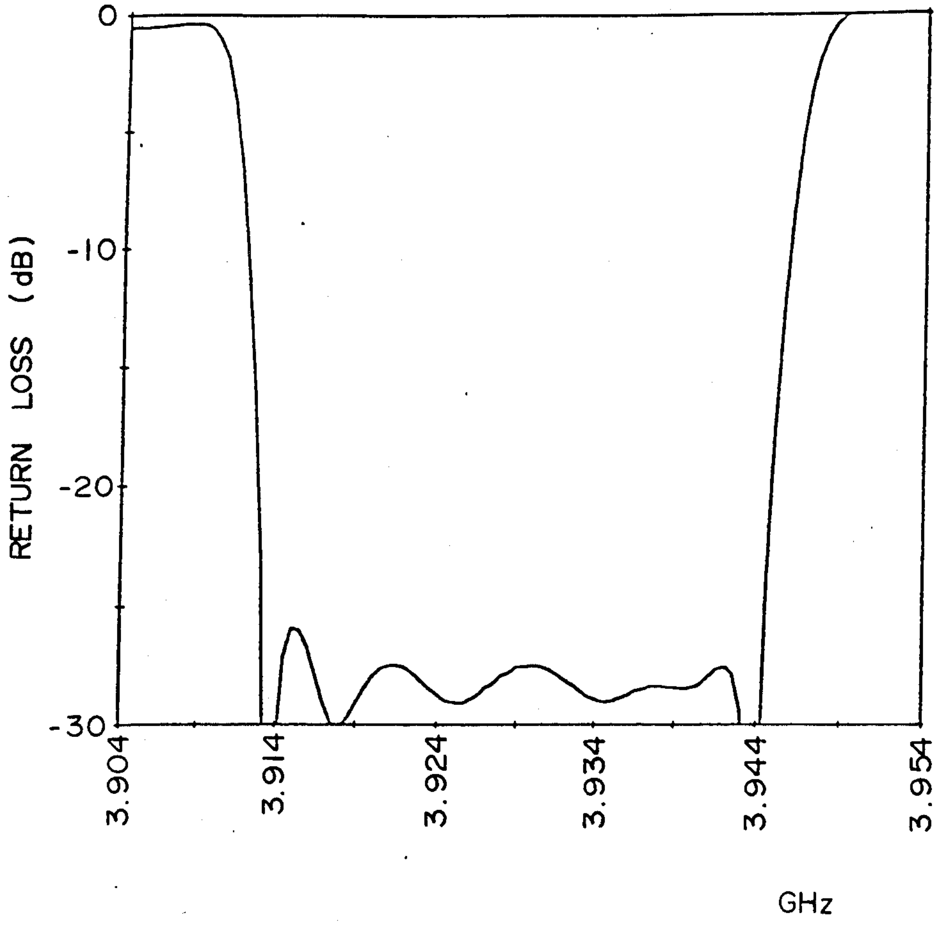

In FIGS. 4A and 4B, there are shown measured amplitude response and return loss response respectively for a prototypesix pole elliptic filter constructed in accordance with the filter 9 shown in FIG. 2. It can readily be seen that the response shown in FIG. 4A represents a true elliptic function and FIG. 4B shows that the filter achieves a better than 25 dB return loss. In achieving the results shown with the filter 9, each cavity was caused to resonate at its resonant frequency in a first and second $TE_{111}$ mode and a third $TM_{010}$ mode. A $TE_{111}$ mode was used for input and output coupling.

Figure 5A:
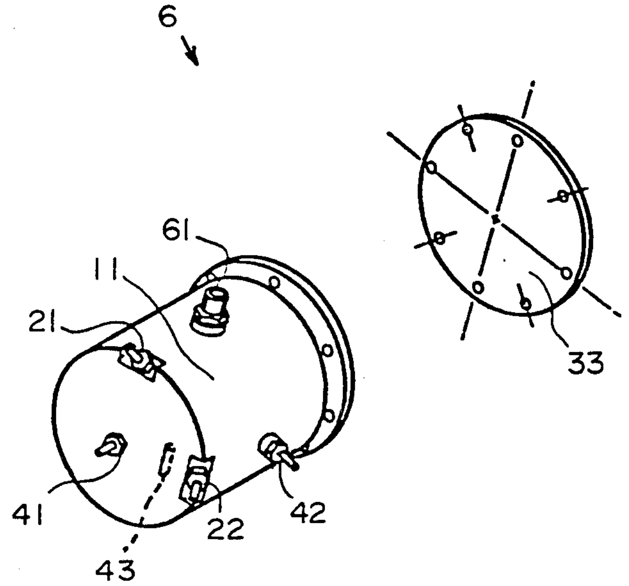
FIG. 5A is an exploded perspective view of a one cavity triple-mode filter in accordance with the present invention where the output has been short circuited.
Figure 5B:
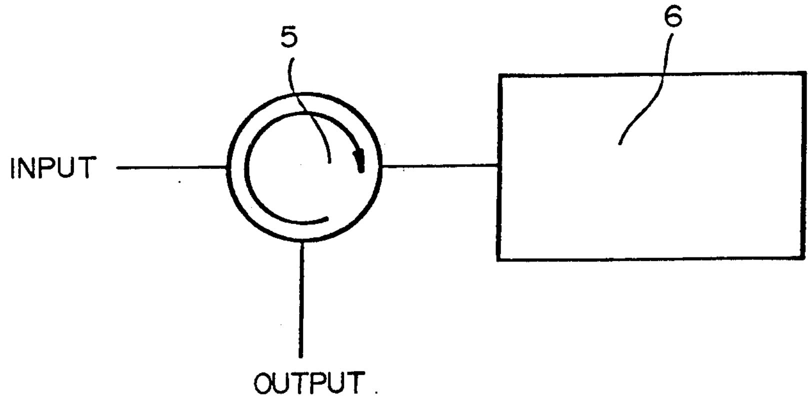
FIG. 5B is a schematic view of the use of a filter in accordance with the present invention as an allpass equalizer.
Figure 6A:
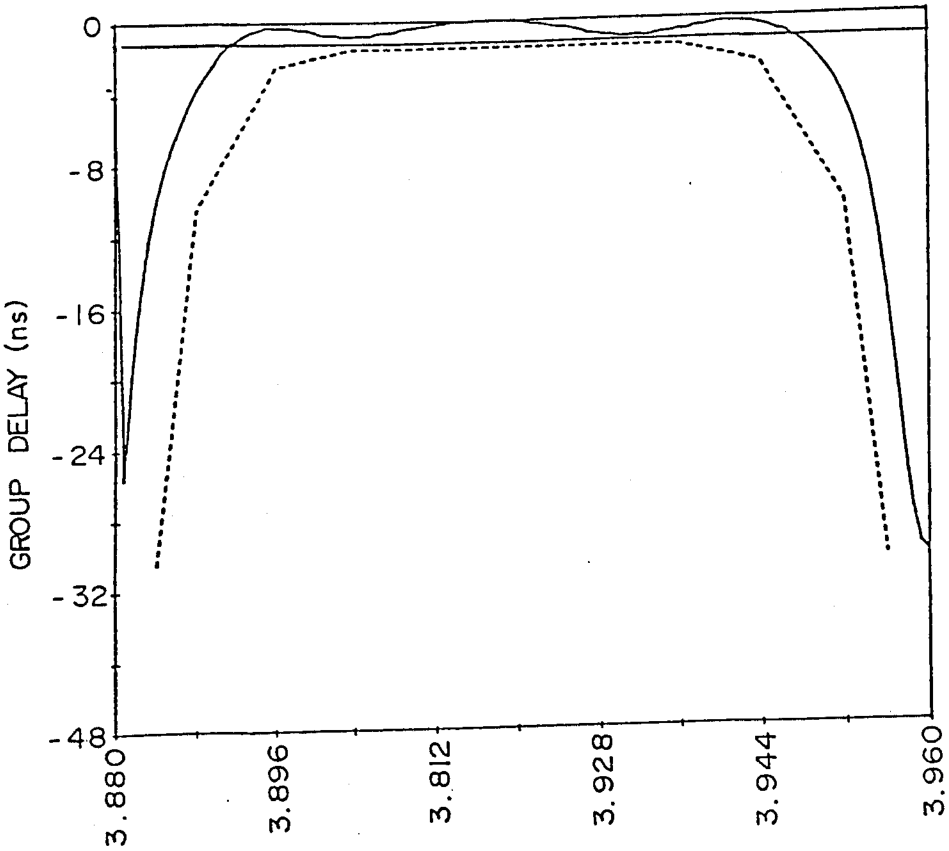
FIG. 6A is a graph showing an experimental response of a conventional dual-mode allpass equalizer.
Figure 6B:
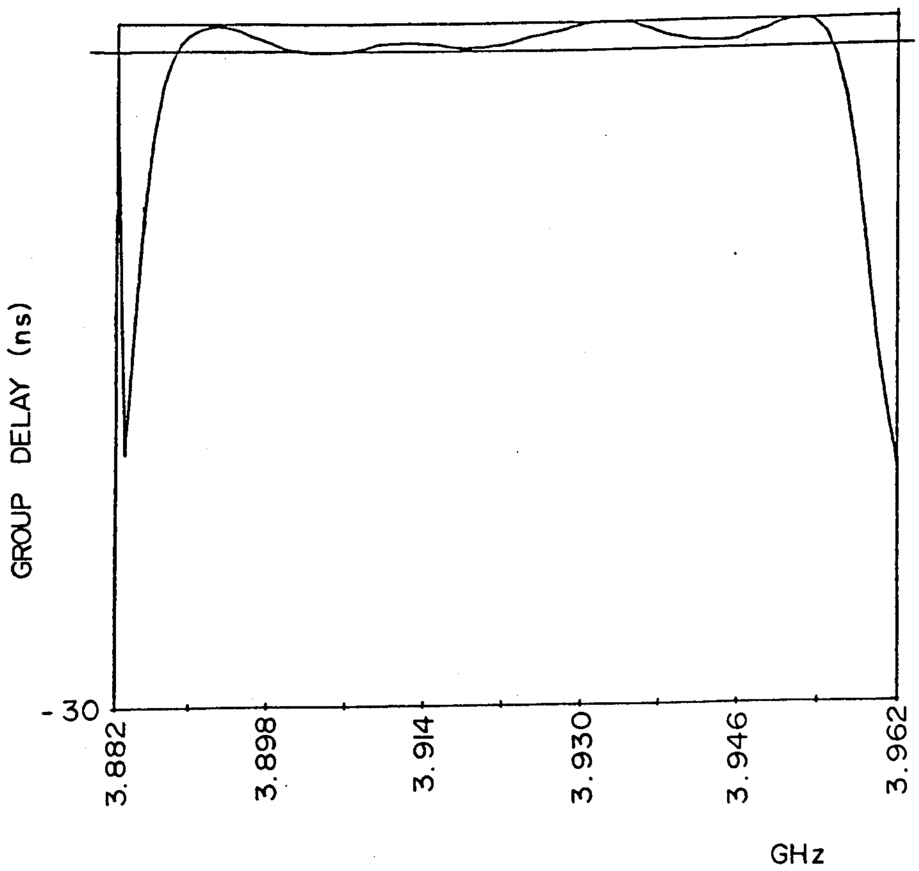
FIG. 6B is a graph showing an experimental response of a triple-mode allpass equalizer in accordance with the present invention; and, FIG. 7 is an exploded perspective view of a triple-mode filter in accordance with the present invention containing dielectric resonators.

In FIG. 5A, in a further embodiment of the present invention, there is shown a reactant cavity 6. The reactant cavity 6 has a cavity 11 and a similar arrangement of coupling screws 21, 22 and tuning screws 41, 42, 43 as cavity 11 of the filter 9 shown in FIG. 2. In addition, the input coupling means 61 is the same as that shown in FIG. 2. However, an output from the cavity 11 has been short circuited using a shorting plate 33 making the reactant cavity 6 a one-port network. When the reactant cavity 6 is used in conjunction with a non-reciprocal structure or circulator 5, as shown schematically in FIG. 5B, it performs the function of an allpass filter (commonly referred to as an allpass equalizer or a group delay equalizer). It will be readily apparent to those skilled in the art that other non-reciprocal structures can be used in substitution for the circulator 5 for example, a hybrid-coupled allpass network could be used as a non-reciprocal structure. As shown in FIG. 5B, the circulator 5 is connected to the input/output 61 of the filter 6. As will be readily apparent to those skilled in the art, the circulator or non-reciprocal structure can be connected to the filter in many different ways. The phase of the allpass filter and, hence, the group delay is controlled by the resonance frequencies and the couplings of three independent modes excited in the physical cavity. Preferably, these modes are the same as those previously described for the filter 9 of FIG. 2. Compared to the conventional dual-mode allpass network, the allpass filter shown in FIG. 5B yields significantly superior phase and group delay characteristics. FIG. 6A describes the group delay of a conventional dual-mode allpass equalizer. In FIG. 6B, there is shown the group delay over the same frequency band using the triple-mode allpass filter of FIG. 5B. The equalized band width shows an improvement of nearly twenty per cent, thereby enhancing the channel capacity and hence the revenue earning potential of a satellite in which such an allpass filter would be used.

As will be readily apparent to those skilled in the art, the allpass filter described in FIGS. 5A and 5B could be designed to use any reasonable number of cavities. However, it is not possible to have more than two adjacent cavities arranged end to end relative to one another and resonating in three independent orthogonal modes. While it is possible to have an allpass filter with more than three cavities functioning in a triple mode, the three cavities cannot be located end to end and adjacent to one another. When two adjacent cascade waveguide cavities are resonating at their resonant frequency and three independent orthogonal modes, there will be located between them an inter-cavity coupling iris. Each iris will contain an aperture that is able to control three inter-cavity couplings simultaneously when said filter is operated in a suitable propagation mode for input and output coupling. An output of said filter is short circuited so that the filter will function as a group delay equalizer when used with a circulator. Preferably, the aperture has four radial slots located perpendicular to one another and offset from a centre of the iris. Preferably, two of the slots are aligned with one another and are the same length and offset from said centre by an equal distance. The remaining two slots are also aligned with one another but have a different length and are offset from said centre by a different but equal distance. Preferably, the filter is operated in a $TE_{11n}$ propagation mode for input and output coupling, n being a positive integer, where the cavities are cylindrical and in a $TE_{10n}$ propagation mode for input and output coupling, n being a positive integer, where the cavities have a square cross-section. Still more preferably, n is equal to 1.

It is believed that by using a triple-mode structure in accordance with the present invention, a weight and volume saving of approximately one-third can be achieved relative to dual-mode filters. The present generation of communication satellites carry twenty-four channels, each channel comprising an input filter and an output filter having a typical weight and volume of approximately 360 grams and 600 cubic centimeters per channel respectively. Therefore, the use of triple-mode filters should represent a weight and volume saving of approximately 2.9 kilograms and 4,800 cubic centimeters respectively for a twenty-four channel satellite.

Use of a triple-mode structure as an allpass filter or network represents a significant performance improvement relative to a dual-mode allpass network or filter. This improved performance should be achievable with no penalty in weight or volume relative to known dual-mode allpass equalizer networks.

The filters 9 and 10 shown in FIGS. 2 and 3 respectively, have two cavities 11, 12. As will be readily apparent to those skilled in the art, within the scope of the attached claims, it will be possible to design a filter having any reasonable number of cavities. Where a filter is of the order N, N being an integral multiple of 3, the number of cavities is equal to N/3. However, it is presently not possible to have more than two adjacent cavities resonating in a triple mode when the cavities are arranged end to end relative to one another. When this occurs, the centre cavity or cavities cannot be made to resonate in a triple-mode. However, as long as the cavities are arranged so that each cavity that resonates in a triple-mode has one end that is exposed, any reasonable number of cavities can be used. For example, one could design an eight cavity triple mode filter where there are four sets of two cavities each. Each set of two cavities has the cavities arranged end to end but the sets themselves are adjacent to one another. In this way, each cavity of the eight cavity filter will have one end exposed so that each cavity can be made to function in a triple mode. Alternatively, it would be possible, though impractical, to have a three cavity filter with each cavity resonating in a triple mode where the centre cavity is turned sideways relative to the two end cavities so that both ends of the centre cavity would be exposed.

Figure 7:
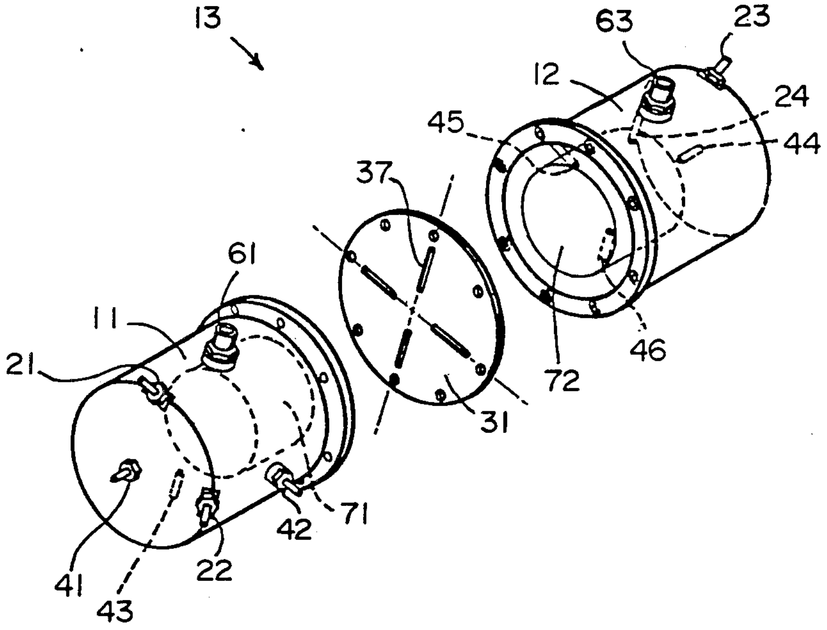

In a further embodiment of the invention as shown in FIG. 7, a filter 13 has a plurality of cascade waveguide cavities 11, 12. The cavities 11, 12 are adjacent to one another and resonate at their resonant frequency in three independent orthogonal modes. The coupling screws 21, 22, 23, 24 and tuning screws 41, 42, 43, 44, 45, 46, as well as the coaxial probes 61, 63 are identical to those shown in FIG. 2. The iris 31 and the apertures 37 are also identical to that shown in FIG. 2. As with the filter of FIG. 2, the physical characteristics of the aperture 37 and iris 31 could be varied so long as the aperture 37 is able to control three inter-cavity couplings simultaneously, when said filter 13 is operated in a suitable propagation mode for input and output coupling, to produce an elliptic function response. Within the cavities 11, 12 there are located dielectric resonators 71, 72 respectively. The purpose of the resonators 71, 72 is to further reduce the overall weight and volume requirement of the triple-mode filters 9 and 10. The use of dielectric loaded resonators with dual-mode filter is described by Fiedziuszko in the IEEE-MTT-S International Microwave Symposion Digest published in June, 1982, pp 386 to 388.

What I claim as my invention is:

1. An allpass filter comprising one cascade waveguide cavity resonating at its resonant frequency in three independent orthogonal modes, said cavity having two ends that are parallel to one another, at least one of said modes being non-identical to the remaining two modes, said filter being operated in a suitable propagation mode for input and output coupling, with an output of said cavity being short circuited so that the filter can function as a group delay equalizer when used with a non-reciprocal structure.

2. A filter as claimed in claim 1 wherein the nonreciprocal structure is a circulator.

3. A filter as claimed in any one of claims 1 or 2 wherein the cavity is cylindrical and the filter is operated in a $TE_{111}$ propagation mode for input and output coupling.

4. A filter as claimed in any one of claims 1 or 2 wherein the cavity has a square cross-section and the filter is operated in a $TE_{101}$ propagation mode for input and output coupling.

* * * * *